United States Patent [19]

Kawada et al.

[11] 4,426,610
[45] Jan. 17, 1984

[54] INDUCTION MOTOR CONTROL SYSTEM

[75] Inventors: Shigeki Kawada, Hino; Katsuo Kobari, Tachikawa, both of Japan

[73] Assignee: Fujitsu Fanuc Limited, Tokyo, Japan

[21] Appl. No.: 388,924

[22] Filed: Jun. 16, 1982

[30] Foreign Application Priority Data

Jun. 19, 1981 [JP] Japan .................................. 56-92797

[51] Int. Cl.$^3$ .............................................. H02P 5/40
[52] U.S. Cl. .................................... 318/798; 318/490; 318/806
[58] Field of Search ............... 318/798, 806, 490, 803, 318/807–811; 363/55–58

[56] References Cited

U.S. PATENT DOCUMENTS 3,800,198  3/1974  Graf et al. ............................ 318/806
3,809,985  5/1974  Krause et al. ........................ 318/490
4,319,177  3/1982  Kawada et al. ...................... 318/811

Primary Examiner—David Smith, Jr.

Attorney, Agent, or Firm—Staas & Halsey

[57] ABSTRACT

A control circuit for driving an induction motor wherein an AC voltage is converted into a direct current by a rectifying circuit and the direct current is converted into a signal having a variable voltage and frequency by a transistor inverter connected in parallel with a smoothing capacitor, and a regenerative circuit is connected in parallel with the inverter, and a first monitoring circuit is provided for comparing the terminal voltage $V_C$ of the smoothing capacitor and a first reference voltage $E_1$ when braking is to take place. When the condition $V_C \geq E_1$ exists, the transistor inverter is disabled but the regenerative circuit is allowed to operate. When the condition $V_C < E_1$ exists, the transistor inverter is operated in the regenerative braking region. A second monitoring circuit is provided for comparing the smoothing capacitor terminal voltage $V_C$ and a second reference voltage $E_2$ ($E_2 > E_1$). When the condition $V_C \geq E_2$ exists, both the transistor inverter and regenerative circuit are disabled immediately.

8 Claims, 7 Drawing Figures

INDUCTION MOTOR CONTROL SYSTEM

BACKGROUND OF THE INVENTION

CROSS REFERENCE TO RELATED APPLICATION

This application is related to U.S. application Ser. No. 388,926, entitled "Induction Motor Control System" and is assigned to the same assignee as the above noted application.

1. Field of the Invention

This invention relates to an induction motor control system and, more particularly, to an induction motor control system which, barring accidents, enables an induction motor to continue running even when there is a large increase in regenerative energy, and which performs regenerative braking with excellent efficiency.

2. Description of the Prior Art

Induction motors are employed in a variety of industrial fields and can be applied to a variety of loads. Some induction motors undergo rapid and frequent increases and decreases in speed, while in others there are positive and negative changes in load torque, such as when used in raising and lowering an object via a hoist. Thus there is a requirement that an induction motor functioning as a driving source be operated so as to generate a positive torque as well as a braking torque.

A method of controlling the operation of induction motors which has recently come into fairly widespread use employs a variable voltage-variable frequency inverter. While no major problems are encountered in this method when operating the motor in the driving mode, one difficulty which does arise is the manner of dealing with the rotational energy possessed by the rotor of the motor when operating the motor in the braking mode at the time of a reduction in speed. Two exemplary methods of dealing with this rotational energy have been adopted in the prior art. In one method, the flow of current to the induction motor is interrupted for braking to permit to slow down naturally owing to mechanical loss attributed to the load. In the other method, the slip which occurs at deceleration is suitably controlled and is allowed to dissipate within the motor. The first method, however, requires too much time to achieve the speed reduction and has a very poor control response, while the second method causes the motor to overheat to such an extent that it cannot endure frequent increases and decreases in speed.

In another method, the rotational energy of the rotor is dissipated by allowing a smoothing capacitor, inserted in the inverter circuitry mentioned above, no charge until the charged voltage exceeds a specified value, whereupon the capacitor is discharged through a braking resistor connected in parallel with the inverter conduit, thereby to dissipate the energy. This method is disadvantageous because it may lead to destruction of the apparatus if the smoothing capacitor is charged to an excessively large voltage, and because costs are raised since the braking resistor increases in size and expense in accordance with the size of the machine to be driven by the motor. Moreover, the method is undesirable in terms of enhancing efficiency because of the fact that the braking energy is wasted in the form of thermal loss.

Figure 1:
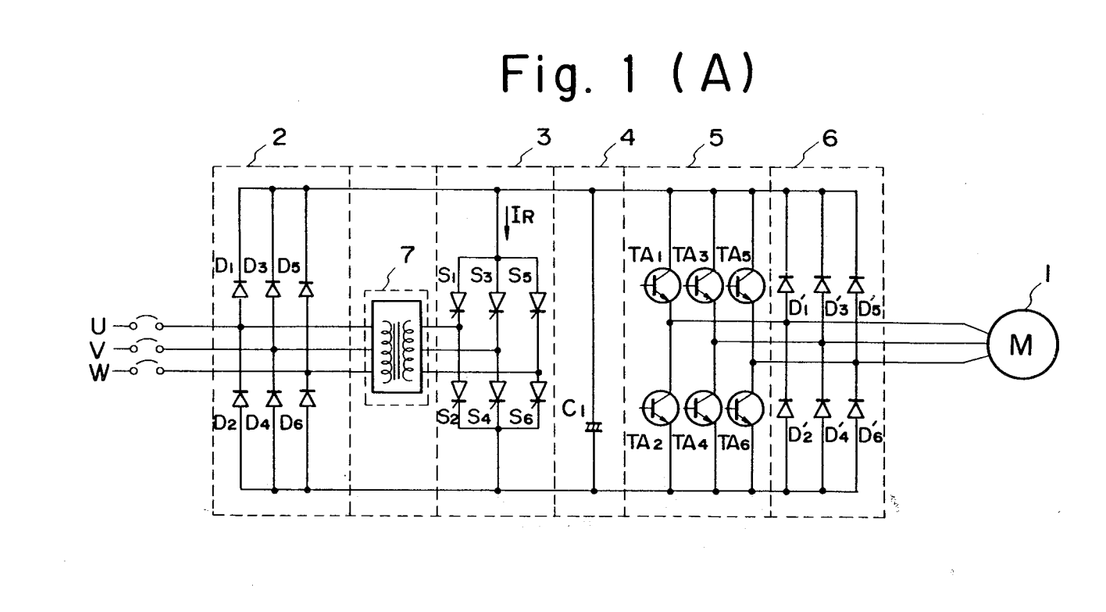
FIG. 1(A) is a circuit diagram of a prior-art apparatus for controlling the operation of an induction motor, which apparatus includes a regenerative braking device comprising a thyristor bridge, and which requires the use of a step-up transformer.
FIG. 1(B) is a circuit diagram of a regenerative circuit having switching transistors, as previously proposed by the Inventors.
Figure 1B:
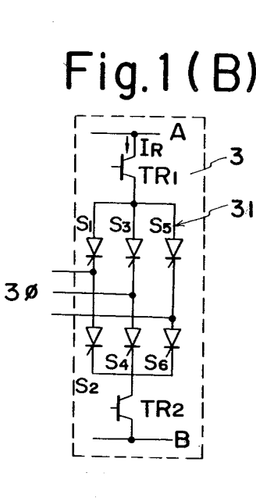

Regenerative braking systems, as shown in FIGS. 1(A) and 1(B), have been proposed in an effort to improve upon the foregoing arrangements.

FIG. 1(A) is a circuit diagram showing an induction motor operation control apparatus of the regenerative braking type according to the prior art. The apparatus includes a three-phase induction motor 1, a full-wave rectifier 2 constructed of diodes $D_1$ through $D_6$ for rectifying the U, V and W phases of the AC input power, a regenerative circuit 3 having a thyristor bridge comprising thyristors $S_1$ through $S_6$, a smoothing circuit 4 having a smoothing capacitor $C_1$, a variable voltage-variable frequency inverter 5 composed of transistors $TA_1$ through $TA_6$, a rectifier 6 comprising diodes $D_1'$ through $D_6'$, and a step-up transformer for boosting the power source voltage.

To control the induction motor 1 with this conventional arrangement, for example, to decelerate the motor, the commanded speed is reduced in magnitude so that the synchronous speed becomes smaller than the motor speed, giving rise to a negative slip condition. Accordingly, the motor operates in the regenerative braking region, with the result that the voltage induced in the motor is rectified by the rectifier 6, thereby raising the voltage on the DC line side. The smoothing capacitor $C_1$, in order for it to exhibit the smoothing function, is charged to a voltage that is 1.3 to 1.4 times the AC power supply voltage even when the motor is operating in the normal driving mode. Nevertheless, when the induction motor is operated in the regenerative region, the smoothing capacitor $C_1$ is charged to, and held at, an even higher voltage. For example, if the AC power supply voltage is 200 volts, the voltage to which the capacitor $C_1$ is charged is raised to approximately 290 volts. When the firing of the regenerative thyristor bridge 3 is controlled under such conditions, commutation cannot take place and regenerative operation becomes impossible even though it may be possible to fire the thyristors because the AC power supply voltage is lower than the voltage on the side of the DC line. In other words, since the thyristors $S_1$ through $S_6$ are forward biased, a thyristor which has already fired cannot be turned off, making regeneration impossible. To avoid this problem, the step-up transformer 7 is inserted between the AC power supply and the thyristor bridge 3, and the circuitry is arranged in such a manner that there will always be intervals in which the AC power supply voltage is higher than the voltage on the DC line side, thereby assuring commutation of the thyristors $S_1$ through $S_6$ and enabling operation in the regenerative braking region. However, the apparatus that employs this system is large in size and high in price owing to the need for the step-up transformer 7 of a large capacity.

In view of the foregoing drawback, the Inventors have previously proposed a system, illustrated in FIG. 1(B), which dispenses with the step-up transformer. In the proposed syste, two switching transistors $TR_1$, $TR_2$ are connected in series with a thyristor bridge 31 and are turned off when any of the thyristors $S_1$ through $S_6$ commutes. This switching action severs the thyristors $S_1$ through $S_6$ from the lines A, B. Thus, overcoming the forward biased state of the thyristors so that commutation is assured.

While the previously proposed system is extremely effective, it does not take into account a situation where the voltage of the smoothing capacitor $C_1$ (FIG. 1(Aa)) may rise owing to a substantial increase in regenerative energy. That is, when the regenerative energy becomes large in magnitude, the voltage developed by the smoothing capacitor $C_1$ rises and there is a gradual increase in the regenerative current $I_R$. This can damage the switching transistors $TR_1$, $TR_2$ or the thyristors $S_1$ through $S_6$ if the regenerative current $I_R$ exceeds an allowable limit. When such an arrangement is applied to the system of FIG. 1(A), the voltage of the smoothing capacitor $C_1$ (referred to as a DC link voltage) is monitored and an alarm signal is issued with said voltage reaches a dangerous level, which is preset. The alarm signal completely halts the operation of the regenerative circuit 3 and transistor inverter 6, with the result that the motor can no longer run from that point onward. More specifically, in the conventional system a large amount of regenerative energy causes the DC link voltage to exceed a preset value, from which point operation of the motor ceases completely. In many cases, however, the present voltage is exceeded not because of a system failure or the like, but merely because the regenerative energy has become too large. In such an event it would be possible to resume operation of the induction motor if means were provided for dissipating the energy stored in the smoothing capacitor. In a case where the preset voltage is exceeded because of a system failure or accident, on the other hand, the magnitude of the overshoot is much greater than that caused by regenerative energy. What holds for the DC link voltage is also true of the motor current and regenerative current.

SUMMARY OF THE INVENTION

The present invention relates to an induction motor control system, and more particularly to the control and protection of an induction motor during regenerative braking.

An object of the present invention is to provide a novel induction motor control system in which, when the regenerative energy takes on a large value and causes the DC link voltage or the motor current to increase and exceed a first preset value, only the transistor inverter is temporarily disabled to allow the energy, stored in the smoothing capacitor, to dissipate through the regenerative circuit without the motor coming to a complete stop; and whereby regenerative braking control of the motor can be resumed after the magnitude of the regenerative energy drops below the first preset value.

Another object of the present invention is to provide an induction motor control system in which, when the DC link voltage or motor current exceeds a second preset value, a failure or accident condition is detected, and an alarm signal is immediately produced and motor operation brought to a complete halt.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
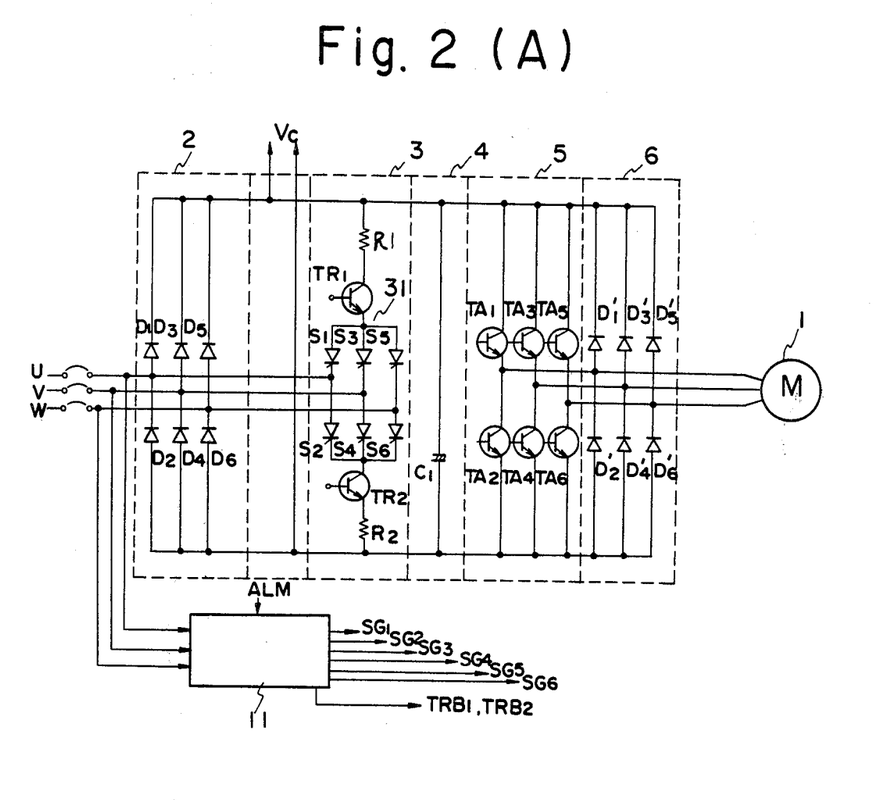
FIG. 2(A) is a block wiring diagram of a first embodiment of an induction motor control system according to the present invention.
FIG. 2(B) is a block wiring diagram of a regeneration control circuit previously proposed by the Inventors.
FIG. 2(C) is a block wiring diagram of a circuit for realizing the control system of the present invention, which circuit is adapted to control the transistor inverter of FIG. 2(A) as well as the regeneration control circuit of FIG. 2(B)
Figure 3:
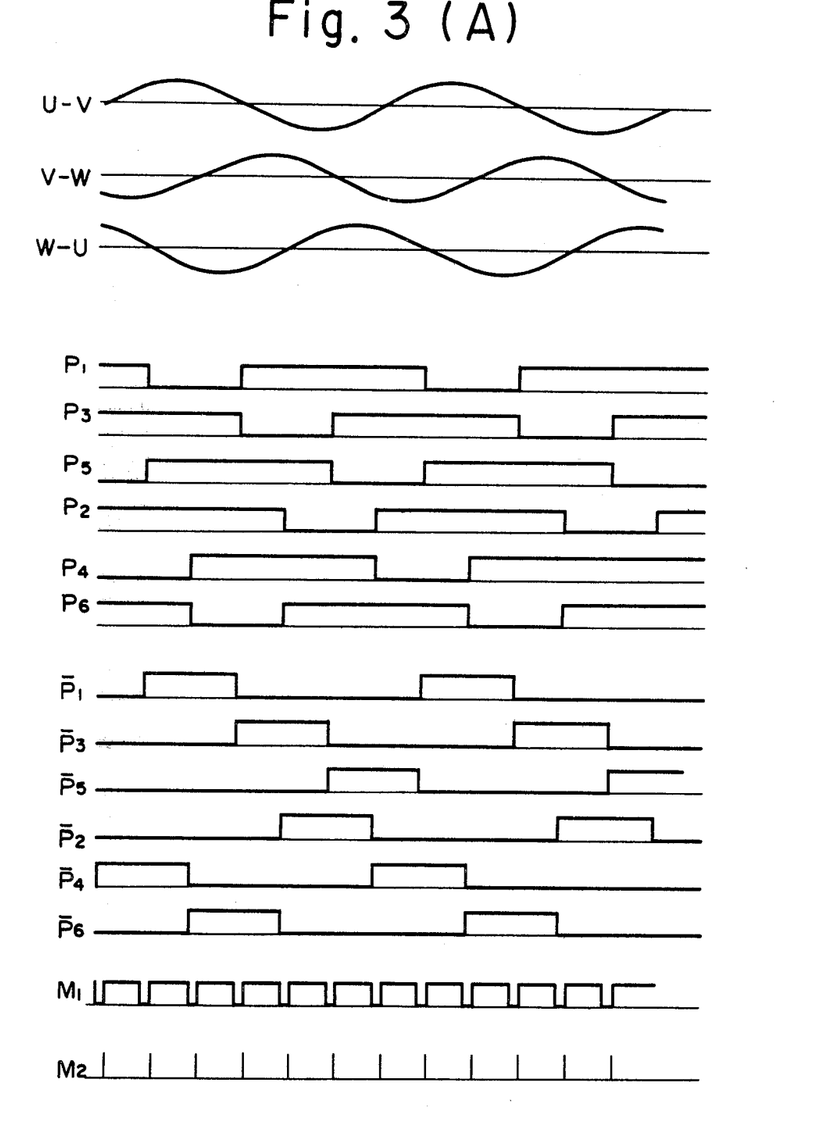
FIGS. 3(A) and 3(B) are waveform diagrams used in explaining various circuit operations based upon the action of the regeneration control circuit of FIG. 2(B).

Referring to FIG. 2(A), reference numeral 11 denotes a regeneration control circuit which generates control signals $SG_1$ through $SG_6$ for controlling the firing of thyristors $S_1$ through $S_6$ constituting the thyristor bridge 31, and which further generates on/off control signals $TRB_1$, $TRB_2$ for controlling the switching transistors $TR_1$, $TR_2$. More specifically, the regeneration control circuit 11 receives the three-phase alternating voltage of the power supply and is adapted to fire the thyristors connected to the two phases that develop the largest interphase voltage. To accomplish this, the regeneration control circuit 11 generates the firing control signals $SG_1$ through $SG_6$. These signals are pulse pairs spaced apart by T/6 (where T is the period of the alternating current), a pair of the pulses being produced in successive fashion at intervals of T/6, as shown in FIG. 3(B). The regeneration control circuit 11 further produces the control signals $TRB_1$, $TRB_2$ in sync with commutation timing. Although this will be discussed in further detail later, the regeneration control circuit 11 can be constructed through use of circuitry previously disclosed by the Inventors in Japanese Patent Application No. 54-104443. The construction of the regeneration control circuit 11 is such that when the DC link voltage $V_C$ exceeds a second preset value $E_2$, described below, an alarm signal ALM goes to logical "1", and the firing control signals $SG_1$ through $SG_6$, as well as the control signal $TRB_1$, are no longer produced.

In FIG. 2(C), reference numeral 12 denotes an inverter control circuit for controlling the timing of each of the transistors $TA_1$ through $TA_6$ constituting the transitor inverter 5. The inverter control circuit 12 produces transistor drive signals $TAD_1'$ through $TAD_6'$ in response to which the transistor inverter 5 supplies the induction motor 1 with a three-phase primary voltage of a frequency and effective value in conformance with the error or deviation between a commanded rotational speed and the actual rotational speed of the motor. As the inverter control circuit 12 is one widely employed in the art, the details of the circuit will not be described here. A monitoring circuit 13 is provided to monitor the terminal voltage (DC link voltage) $V_c$ of the smoothing capacitor $C_1$. The monitoring cicuit 13 compares the magnitudes of its two inputs, namely the DC link voltage $V_C$ and a reference voltage $E_1$, namely a first preset value, and produces a signal RGS whose level is low (logical "0") when the condition $V_C \geqq E_1$ holds, and high (logical "1") when the condition $V_C \geqq E_1$ holds. A monitoring circuit 14, whose two inputs are the DC link voltage $V_C$ and the second preset value $E_2$ mentioned above, compares the magnitudes of these inputs and produces a signal TGS whose level is high (logical "1") when the condition $V_C \geq E_2$ holds, and whose level is low (logical "0") when the condition $V_C \geq E_2$ holds. A flip-flop 16, initially in the reset state, is set and produces the alarm signal ALM when signal TGS goes high. The set output of the flip-flop 15 is applied to a NOT gate 16, whose is output is connected to a group of AND gates 17. The AND gates 17 take the AND among the signal RGS, each of the transistor drive signals $TAD_1'$ through $TAD_6'$, and a signal *ALM, which is the inverse of the alarm signal ALM. The outputs of the AND gates 17 are connected to respective amplitifers 18 for producing drive signals $TAD_1$ through $TAD_6$, respectively.

In the operation of the apparatus of the present invention having the foregoing construction, when the induction motor 1 is running in the ordinary driving mode, each phase of the AC power supply is rectified into a direct current by the rectifier 2. The transistor inverter 5 converts the direct current into an alternating current of a prescribed frequency and voltage which is applied to the induction motor 1 to bring the motor speed into agreement with the commanded speed. The output frequency of the inverter 5 is capable of being varied by adjusting the repetition frequency of the drive signals $TAD_1$ through $TAD_6$ for driving the transistors $TA_1$ through $TA_6$ constituting the inverter, and the output voltage of the inverter is capable of being varied by adjusting the conduction time of the transistors $TA_1$ through $TA_6$. When a deceleration command signal is issued, such as when it is required to decelerate the motor in accordance with the load conditions, the induction motor starts to operate in the region of negative slip S, that is, in a regenerative braking region, since the rotational speed of the running motor is greater than the synchronous speed. The output of the motor consequently is rectified by the rectifier 6 and raises the voltage on the DC line side. If the motor is operating at an AC power supply voltage of 200 volts, then the voltage at the terminals of the smoothing capacitor $C_1$ will be raised to approximately 290 volts. As described above, in accordance with a feature of the present invention, the switching transistors $TR_1$, $TR_2$ are connected in series with the thyristor group of the regenerative circuit 3. Generally, these transistors are conductive during regenerative operation, are momentarily non-conductive when any of the thyristors $S_1$ through $S_6$ is to commute, thereby interrupting the flow of current to the thyristors. The transistors $TR_1$, $TR_2$ are rendered conductive again upon taking into account the time during which the thyristors are completely extinguished. Even if the voltage on the DC line side should happen to be higher than the AC voltage of the power supply, therefore, the regenerative current $I_R$ will always be fed back to the power suply without any of the thyristors experiencing commutation failure.

Reference will now be had to FIG. 2(B) to describe the construction and regenerative action of the regeneration control circuit 11 previously proposed by the Inventors.

As shown in FIG. 2(B), numeral 8 denotes one of the two sections constituting a photocoupler, the other section being made up of such elements as a grou of photo-transistors $P_1''$ through $P_6''$, which will be described below. The photocoupler 8 includes elements such as light-emitting diodes $P_1'$ through $P_6'$ and diodes $D_1''$ through $D_6''$, these being connected in the form of a bridge circuit whose AC input side receives the three-phase AC power for the motor, namely the U, V and W phasees, in a phase relationship which corresponds to that received by the respective thyristors in the thyristor bridge of the regenerative circuit 3. The diodes $D_1''$ through $D_6''$ serve also to protect the circuit against reverse voltages. $P_1''$ through $P_6''$ designate photo-transistors or the like, as mentiioned above. The arrangement is such that when light-emitting diode $P_1'$ emits light in response to an inflow of current, the element $P_1''$, serving as a light receptor, is rendered conductive upon intercepting the emitted light. The output terminal of each element $P_1''$ through $P_6''$ is provided with an inverter for inverting the output signal. The output signals from all of the inverters 9 are applied to an OR circuit 10 whose output is in turn coupled to a first monostable multivibrator 19 for generating negative pulses of a fixed duration. A second multivibrator 20 responds to the output of the first monostable multivibrator 19 to produce pulses of a fixed duration. The AND gates 22 perform the logical AND between the outputs of the respective inverters 9 and the output of the second monostable multivibrator 20. There are the same number of AND gates 22 as there are inverters 9. The outputs of the AND gates 22 are gating signals $SG_1$ through $SG_6$, namely the firing control signals mentioned earlier, which are applied to the gates of the corresponding thyristors $S_1$ through $S_6$ that form the regenerative thyristor bridge 3. The pulses produced by the first monostable multivibrator 19 are base signals $TRB_1$, $TRB_2$, namely the aforementioned control signals, and are applied simultaneously to the switching transistors $TR_1$, $TR_2$ connected in series with the thyristor group in the thyristor bridge 3.

Described next will be the formation of the control signals by means of the regeneration control circuit 11 having the foregoing construction.

The input side of the bridge circuit 8, comprises the light-emitting diode elements $P_1'$ through $P_6'$ for constructing a photocoupler, and is connected to the U, V and W-phases of the motor driving source. With such a connection, the bridge circuit 8 receives the same interphase voltages as does the regenerative thyristor bridge 3 so that, from among the thyristors constituting the thyristor bridge 3, it is possible to detect the particular thyristor corresponding to that pulse in which firing must be executed to achieve regenerative action. For a better understanding of this operation, reference will be had to FIG. 3(A). Sinusoidal interphase voltages U-V, V-W, W-U are impressed upon the corresponding phase input terminals of the bridge that forms the photocoupler. A current flows only into those light-emitting diodes that receive the largest interphase voltage of the interphase voltages that are applied, these diodes respond by emitting light for the duration of the current flow. The light-emitting diodes $P_1'$ through $P_6'$ are excited in succession in accordance with the temporal variation of the interphase voltages. The other photocoupler section, namely the section comprising of phototransistors $P_1''$ through $P_6''$ serving as the light receptors, is so arranged as to intercept the light from the light-emitting diodes. Hence, when a light-emitting diodes is excited and caused to emit light, the corresponding phototransistor intercepts the light and is rendered conductive, its collector potential going to zero volts and remaining there for as long as the element continues to receive light. The outputs of the photo-transistors are illustrated by the waveforms $P_1$ through $P_6$ in FIG. 3(A). These signals are inverted to produce signals $\overline{P_1}$ through $\overline{P_6}$ by means of the inverters 9 connected to the output of each photo-transistor. The inverted signals are applied to one input terminal of each of the corresponding AND gates 22, and to the input side of the OR gate 10. Accordingly, the OR gate 10 delivers pulses successively to the monostable multivibrator 19, a pulse being produced by the OR gate for each pulse in the signals $\overline{P_1}$ through $\overline{P_6}$. The monostable multivibrator 19 is triggered by the leading edge of each received pulse and is rendered conductive only for a fixed period of time, after which the output of the multivibrator returns to its original state. This operation continues in repectitive fashion to produce the pulse train shown by $M_1$ in FIG. 3(A). The pulse train has a potential of zero volts for intervals of about 0.5 milliseconds (conduction interval), and is applied to the bases of the switching transistors $TR_1$, $TR_2$ connected in series with the regenerative thyristor bridge, thereby serving to drive the base potentials of the transistors to zero volts to render the transistors non-conductive In addition, the pulse train $M_1$ is applied to the second monostable multivibrator 20 which is triggered to produce the pulse train illustrated by $M_2$ is FIG. 3(A). The pulses are positive pulses having a width of approximately 10 microseconds, and they are timed by the leading edge of each pulse in signal $M_1$; that is, each time the signal $M_1$ returns to its original potential. The positive (i.e., logical "1") pulses in pulse train $M_2$ are applied to each of the AND gates 22. The AND gates 22 perform the logical AND between the signals $P_1$ through $P_6$ (from the inverters 9), and the output pulses $M_2$ from the second monostable multivibrator 20, thereby producing the firing signals $SG_1$ through $SG_6$ which are delivered to the respective gates of the thyristors $S_1$ through $S_6$ that construct the regenerative thyristor bridge. The phase relationship among the signals $SG_1$ through $SG_6$, shown in FIG. 3(B), is of course governed by the output signals $P_1$ through $P_6$ of the photocoupler.

Accordingly, asume that the U-V phases of the AC power supply exhibit the largest interphase voltage suitable for regeneration. When the zero-potential pulses $TRB_1$, $TRB_2$ of FIG. 3(B) are applied to the switching transistors $TR_1$, $TR_2$, the transistors are rendered non-conductive simultaneously to temporarily cut off the flow of current to the thyristor bridge 3, thereby turning off all of the thyristors $S_1$ through $S_6$. After this occurs the firing signals are re-applied to the gates of thyristors $S_1$ and $S_4$ which are fired into conduction as a result, whereby energy is returned by a regenerative current $I_R$ which flows from the U-phase of the power supply to the V-phase thereof. After a prescribed time period the zero-potential pulses are re-applied to the switching transistors $TR_1$, $TR_2$ to again render them non-conductive, thereby temporarily turning off all of the transistors in the regenerative thyristor bridge 3 once again. When this has been achieved the switching transistors are driven into conduction again, and firing signals are applied to the thyristors $S_1$, $S_6$ simultaneously. As a result, a regenerative current flows from the U-phase into the W-phase. This operation continues in similar fashion. That is, all of the thyristors are turned off by rendering both switching transistors $TR_1$, $TR_2$ non-conductive by applying the zero-potential pulses thereto prior to the commutation of the thyristors and, in successive fashion, the firing signals $SG_2$, $SG_6$ are applied to the thyristors $S_2$, $S_6$, the firing signals $SG_3$, $SG_2$ are applied to thyristors $S_3$, $S_2$, and the firing signals $SG_5$, $SG_2$ are applied to the thyristors $S_5$, $S_2$. As a result, a regenerative current can be supplied to the two phases of the AC power supply that exhibit the largest interphase voltage. Furthermore, commutation is reliable since the thyristors are turned off temporarily prior to being fired due to the thyristor current being interrupted without fail by means of the switching transistors $TR_1$, $TR_2$. The conductive states of thyristors $S_1$ through $S_6$, as well as the waveform of the regenerative current $I_R$, are illustrated by $S_1$ through $S_6$ and by $I_R$, respectively, in FIG. 3(B).

When the regenerative energy takes on a large value, all of the energy cannot be returned to the power supply, so that there is a gradual rise in the terminal voltage $V_C$ of the smoothing capacitor $C_1$. As a result, there is also an increase in the regenerative current $I_R$, as given by the following equation:

$$I_R = (V_C - V_{AC})/(r_1 + r_2)$$

where $V_C$ is the terminal voltage of the smoothing capacitor $C_1$, namely the DC link voltage, $V_{AC}$ the effective value of the power supply voltage, and $r_1$, $r_2$ the magnitudes of the resistors $R_1$, $R_2$, respectively, connected in series with the switching transistors $TR_1$, $TR_2$. The DC link voltage $V_C$ is compared against the reference voltage $V_4$ in monitoring circuit 13, as described earlier. It should be noted that the magnitude of the reference voltage $E_1$ is selected accordance with the magnitude of the DC link voltage associated with respect to the maximum allowable current with of the switching transistors $TR_1$, $TR_2$. If the regenerative energy increases to such an extent that $V_C \geq E_1$ holds, then the output signal RGS of monitoring circuit 13 will be logical "0". As a result, the outputs of all AND gates 17 will be logical "0", causing all of the drive signals $TAD_1$ through $TAD_6$ to be logical "0". This cuts off all of the transistors $TA_1$ through $TA_6$ in the transistor inverter 5, whereby the inverter ceases to function. When this occurs, the regenerative energy cannot be returned to the power supply. Instead, the energy stored in the smoothing capacitor $C_1$ is returned to the power supply through the regenerative circuit 3, so that the terminal voltage $V_C$ gradually decreases to establish the condition $V_C < E_1$. This condition causes the signal RGS goes to logical "1", restoring the transistor inverter 5 to the operable state so that the regenerative energy may once again be returned to the power supply. Thereafter the foregoing operations are repeated, with either the regenerative energy being returned to the power supply or the transistor inverter 5 being temporarily disabled (during which time the energy stored in the smoothing capacitor $C_1$ is dissipated), in accordance with the magnitudes of $V_C$ and $E_1$.

Meanwhile, the monitoring circuit 14 is comparing the DC link voltage $V_C$ with the second preset value $E_2$, which is greater than the first preset value $E_1$. It should be noted that the size of the second preset value $E_2$ is selected in accordance with the magnitude of the DC link voltage that may be regenerated in the event of a failure or accident. When such a failure or accident occurs and the DC link voltage exceeds the second preset voltage $E_2$, and this condition is sensed immediately by the monitoring circuit 14 which responds by producing the signal TGS (logical "1"). The signal TGS being a logical "1" causes flip-flop 15 placed and held in the set state so that the alarm signal ALM is raised to the high level. As a result of ALM being high, all of the AND gates 17 are closed, so that all of the transistor drive signals $TAD_1$ through $TAD_6$ are held at logical "0". In other words, the inverting action of the transistor inverter 5 is completely inhibited. The alarm signal is coupled also to a display unit to give an indication of the failure. The alarm signal is also applied to the regeneration control circuit 11. When the alarm signal is a logical "1", the firing control signals $SG_1$ through $SG_6$ are no longer produced, thereby inhibiting the regeneration action of the regenerative circuit 3. It should be noted that an alternative method of halting the production of the signals $SG_1$ through $SG_6$ would be to perform the logical AND between the signal $\overline{ALM}$ and these signals.) The result is that the induction motor comes to a complete stop. When the cause of the failure or accident has been removed, motor operation can be restored by resetting the flip-flop 15.

The present invention is not limited to the preferred embodiment described above. For instance, the motor current can be sensed and used instead of the DC link voltage. That is, first and second current detection levels $I_1$, $I_2$ ($I_1 < I_2$) can be preset, with the inverting action of the transistor inverter being halted temporarily when the motor current $I_c$ exceeds the level $I_1$. When $I_2$ is exceeded, the alarm signal would be generated to disable both the transistor inverter and the regenerative circuit, thereby halting motor operation. A current transformer or the like may be used to sense the motor current.

In accordance with the present invention as described above, control of induction motor operation can be continued, without bringing the motor to a complete stop, even when the DC link voltage $V_C$ or motor current $I_C$ exceeds the first preset value $E_1$ or $I_1$ owing to a comparatively large amount of regenerative energy. And, if $V_C$ or $I_C$ should exceed the second preset value $E_2$ or $I_2$ because of a system failure or accident, them motor operation can be halted to protect the elements constituting the regenerative circuit and transistor inverter. Accordingly, motor operation almost never comes to a thus enabling control to be effected in a highly efficient and reliable manner.

As many apparently widely different embodiments of the present invention can be made without departing from the spirit and scope thereof, it is to be understood that the invention is not limited to the specific embodiments thereof except as defined in the appended claims.

What we claim is:

1. An induction motor control system for controlling the actual speed of an induction motor in accordance with a commanded speed, the system having a braking mode in which a regenerative current is generated, said system comprising:
   a rectifier connect able to an AC power supply for converting alternating current into direct current;
   a transistor inverter including a plurality of transistors operatively connected to receive the direct current and connectable to the induction motor, for converting the direct current into three-phase AC signals for driving the induction motor and having a voltage and frequency in conformance with a deviation between the commanded speed and the actual speed of the induction motor;
   an inverter control circuit operatively connected to the transistor inverter, for providing switching signals for controlling the switching action of the plurality of transistors comprising the transistor inverter;
   a regenerative circuit connectable to the AC power supply including a plurality of switching elements, the regenerative circuit being connected in parallel with the transistor inverter for controlling the flow of the regenerative current during braking;
   a smoothing capacitor operatively connected in parallel with the transistor inverter and to receive the direct current;
   a regeneration control circuit connectable to the AC power supply and operatively connected to the regenerative circuit, for controlling the regenerative circuit switching elements; and
   detecting means, operatively connected to the induction motor and between the inverter control circuit and the transistor inverter, for detecting the magnitude of the motor current, for temporarily disabling the transistor inverter upon detecting that the motor current has exceeded a first current detection level $I_1$, for enabling said transistor inverter upon detecting that said motor current has fallen below said first current detection level $I_1$, and for providing an alarm signal and completely halting the operation of the induction motor upon detecting that the motor current has exceeded a second current detection level $I_2$ being greater than the first current detection level I.

2. An induction motor control system for controlling the actual speed of an induction motor in accordance with a commanded speed, the system having a braking mode in which a regenerative current is generated, said system comprising:
   a rectifier connectable to an AC power supply for converting alternating current into direct current;
   a transistor inverter including a plurality of transistors operatively connected to receive the direct current and connectable to the induction motor, for converting the direct current into three-phase AC signals for driving the induction motor and having a voltage and frequency in conformance with a deviation between the commanded speed and the actual speed of the induction motor;
   an inverter control circuit operatively connected to the transistor inverter, for providing switching signals for controlling the switching action of the plurality of transistors comprising the transistor inverter;
   a regenerative circuit connectable to the AC power supply including a plurality of switching elements, the regenerative circuit being connected to parallel with the transistor inverter for controlling the flow of the regenerative current during braking;
   a smoothing capacitor operatively connected in parallel with the transistor inverter and to receive the direct current;
   a regeneration control circuit connectable to the AC power supply and operatively connected to the regenerative circuit, for controlling the regenerative circuit switching elements; and
   detecting means, operatively connected to the smoothing capacitor, and between the inverter control circuit and the transistor inverter, for detecting the magnitude of the smoothing capacitor voltage, for temporarily disabling the transistor inverter upon detecting the the magnitude of the smoothing capacitor voltage has exceeded a first voltage detection level $E_1$, for enabling said transistor inverter upon detecting that said magnitude of the smoothing capacitor voltage has fallen below said first voltage detection level $E_1$, and for providing an alarm signal and completely halting the operation of the induction motor upon detecting that the magnitude of the smoothing capacitor voltage has exceeded a second voltage detection level $E_2$ being greater than the first current detection level $E_1$.

3. An induction motor control system according to claim 1, wherein said detecting means comprises:
comparison means for comparing the magnitude of the motor current and the first and second current detection levels, and for providing first and second control signals responsive to said magnitude of the motor current being greater than or equal to the first and second current detection levels, respectively;
gating means responsive to said first and second control signals, and to said inverter control circuit, for providing gating signals for controlling corresponding ones of the plurality of transistors of the transistor inverter;
amplifying means operatively connected between the gating means and the transistor inverter, for amplifying the gating signals and for providing the amplified signals to the corresponding ones of the plurality of transistors of the transistor inverter.

4. An induction motor control system according to claim 2, wherein said detecting means comprises:
comparison means for comparing the magnitude of the smoothing capacitor voltage and first and second voltage detection levels, and for providing first and second control signals response to said magnitude of the smoothing capacitor voltage being greater than or equal to the first and second voltage detection levels, respectively;
gating means, responsive to said first and second control means, and to said inverter control circuit, for providing gating signals for controlling corresponding ones of the transistors of the transistor inverter;
amplifying means, operatively connected between the gating means and the transistor inverters, for amplifying the gating signals and for providing the amplified signals to the corresponding ones of the plurality of transistors of the transistor inverter.

5. An induction motor control system according to claim 3, wherein said gating means comprises a plurality of AND gates, each AND gate being operatively connected to receive said first and second control signals and to receive a corresponding one of the switching signals and providing a respective one of the gating signals.

6. An induction motor control system according to claim 4, wherein said gating means comprises a plurality of AND gates, each AND gate being operatively connected to receive said first and second control signals and to receive a corresponding one of the switching signals and providing a respective one of the gating signals.

7. An induction motor control system according to claim 3, wherein said comparison means further comprises flip-flop means, set in response to said motor current being greater than said second current detection level, $E_2$.

8. An induction motor control system according to claim 4, wherein said comparison means further comprises a flip-flop means, set in response to said smoothing capacitor voltage being greater than said second voltage detection level $E_2$.

* * * * *

UNITED STATES PATENT AND TRADEMARK OFFICE
CERTIFICATE OF CORRECTION

PATENT NO.   : 4,426,610
DATED        : January 17, 1984
INVENTOR(S)  : Kawada et al.

It is certified that error appears in the above-identified patent and that said Letters Patent is hereby corrected as shown below:

Front Page, [30] Foreign Application Priority Data, "Jun. 19" should be --Jun. 16--.
Column 1, line 52, "no" should be --to--;
          line 56, "conduit" should be --circuit--.
Column 2, line 55, "syste" should be --system--.
Column 5, lines 26, 27, 28, [wronge print size];
          line 61, "grou" should be --group--.
Column 6, line 5, "mentiioned" should be --mentioned--;
          line 43, "pulse" should be --phase--;
          line 56, delete "of";
          line 67, There should be a space between "$\overline{P}_1$" and "through"; and a space between "$\overline{P}_6$" and "by".
Column 7, line 11, "repectitive" should be --repetitive--;
          line 37, "asume" should be --assume--.
Column 8, line 24, "$V_4$" should be --$V_r$--;
          line 26, after "selected" insert --in--;
          line 27, delete "re-";
          line 28, delete "spect to";
          line 63, after "15" insert --to be--.
Column 9, line 3, begin new paragraph with "The";
          line 34, "them" should be --then--;
          line 38, after "to a" insert --halt--;
          line 51, "connect able" should be --connectable--.

UNITED STATES PATENT AND TRADEMARK OFFICE
CERTIFICATE OF CORRECTION

PATENT NO. : 4,426,610

DATED : January 17, 1984

INVENTOR(S) : Kawada et al.

It is certified that error appears in the above-identified patent and that said Letters Patent is hereby corrected as shown below:

Column 10, line 61, "the the" should be --that the--.
Column 11, line 29, "response" should be --responsive--.

Signed and Sealed this

Fifth Day of June 1984

[SEAL]

Attest:

GERALD J. MOSSINGHOFF

Attesting Officer     Commissioner of Patents and Trademarks